(12) United States Patent
Ono et al.

(10) Patent No.: US 10,846,754 B2
(45) Date of Patent: Nov. 24, 2020

(54) SERVICE PROVIDING SYSTEM, SERVICE PROVIDING METHOD, TERMINAL CONTROL METHOD, AND NON-TRANSITORY RECORDING MEDIUM

(71) Applicant: Rakuten, Inc., Tokyo (JP)

(72) Inventors: Tomonari Ono, Tokyo (JP); Teppei Hida, Tokyo (JP)

(73) Assignee: Rakuten, Inc., Tokyo (JP)

( * ) Notice: Subject to any disclaimer, the term of this patent is extended or adjusted under 35 U.S.C. 154(b) by 0 days.

(21) Appl. No.: 16/439,172

(22) Filed: Jun. 12, 2019

(65) Prior Publication Data

US 2019/0391862 A1 Dec. 26, 2019

(30) Foreign Application Priority Data

Jun. 20, 2018 (JP) ................................. 2018-117137

(51) Int. Cl.
    *G06Q 30/02*    (2012.01)
    *G06F 3/0481*   (2013.01)
    *G06F 9/451*    (2018.01)

(52) U.S. Cl.
    CPC ....... *G06Q 30/0272* (2013.01); *G06F 3/0481* (2013.01); *G06F 9/451* (2018.02); *G06Q 30/0277* (2013.01)

(58) Field of Classification Search
    CPC ............ G06Q 30/0277; G06Q 30/0272; G06F 3/0481; G06F 16/957; G06F 9/451
    See application file for complete search history.

(56) References Cited

U.S. PATENT DOCUMENTS

| | | | | |
|---|---|---|---|---|
| 6,459,440 B1* | 10/2002 | Monnes | ................. | G06F 3/0481 715/808 |
| 7,162,739 B2* | 1/2007 | Cowden | .................. | G06F 16/95 726/22 |
| 8,667,417 B1* | 3/2014 | Goodger | ............... | G06F 16/957 715/808 |
| 2004/0001102 A1* | 1/2004 | Blaschke | ................. | G09G 5/14 715/789 |
| 2004/0098451 A1* | 5/2004 | Mayo | ...................... | H04L 67/20 709/203 |

(Continued)

FOREIGN PATENT DOCUMENTS

JP          2015-215901 A       12/2015

*Primary Examiner* — Brian W Wathen
(74) *Attorney, Agent, or Firm* — Sughrue Mion, PLLC

(57) ABSTRACT

A server includes a provider that provides, when a contents ID to identify contents is designated from a terminal, the contents associated with the contents ID to the terminal. The terminal includes a display that displays the contents obtained from the server on a screen. The provider puts predetermined suppress information in the contents when a busy level of the server is higher than a predetermined threshold. When a present date and time is within a display time period set to a popup message and the contents displayed on the screen do not contain the predetermined suppress information, the display displays, in the screen, the popup message so as to be laid over on the contents or displays the popup message instead of the contents, and when the displayed contents contain the predetermined suppress information, the display keeps displaying the contents in the screen.

13 Claims, 8 Drawing Sheets

(56) References Cited

U.S. PATENT DOCUMENTS

| | | | | |
|---|---|---|---|---|
| 2005/0066290 A1* | 3/2005 | Chebolu | ............... | G06F 9/451 |
| | | | | 715/808 |
| 2006/0190831 A1* | 8/2006 | Kelso | ................... | G06F 3/0481 |
| | | | | 715/764 |
| 2007/0300178 A1* | 12/2007 | McArdle | .............. | G06F 3/0481 |
| | | | | 715/781 |
| 2011/0113355 A1* | 5/2011 | Suave | .................... | G06F 9/451 |
| | | | | 715/760 |
| 2015/0324842 A1 | 11/2015 | Yoon | | |
| 2016/0124584 A1* | 5/2016 | Mengerink | ............ | G06F 9/451 |
| | | | | 715/808 |
| 2018/0322538 A1* | 11/2018 | Linnamaki | ............. | H04L 67/02 |
| 2018/0359207 A1* | 12/2018 | Chatterjee | .............. | H04L 51/12 |

\* cited by examiner

FIG.4

CONTENTS REQUEST PAST-RECORD DB

121

| RECEIVED DATE AND TIME | CONTENTS ID |
|---|---|
| 2018/02/11 15:43 | C001 |
| 2018/02/11 15:43 | C003 |
| 2018/02/11 15:42 | C001 |
| 2018/02/11 15:42 | C001 |
| 2018/02/11 15:42 | C002 |
| 2018/02/11 15:41 | C001 |
| 2018/02/11 15:40 | C001 |
| ⋮ | ⋮ |

SERVICE PROVIDING SYSTEM, SERVICE PROVIDING METHOD, TERMINAL CONTROL METHOD, AND NON-TRANSITORY RECORDING MEDIUM

CROSS-REFERENCE TO RELATED APPLICATION

This application claims the benefit of Japanese Patent Application No. 2018-117137, filed on Jun. 20, 2018, the entire disclosure of which is incorporated by reference herein.

FIELD

This application relates generally to a service providing system, a service providing method, a terminal control method, and a non-transitory recording medium.

BACKGROUND

As an example conventional method of displaying an advertisement on a terminal, Unexamined Japanese Patent Application Kokai Publication No. 2015-215901 discloses a method of causing an advertisement application to transmit a keyword to a server based on the keyword input by a user, and of displaying, on a terminal, an advertisement decided by the server based on the keyword.

SUMMARY

According to the method disclosed in Unexamined Japanese Patent Application Kokai Publication No. 2015-215901, the advertisement is displayed at an unintended timing for the user, and thus the user may feel that the displayed advertisement is a disturbance. When, in particular, the user is viewing contents that need a real-time viewing using the terminal, and when a popup message like a message for requesting the user to evaluate an advertisement or application is displayed at an unintended timing for the user, such a message disturbs the user to view the contents. Hence, even if the popup message is displayed, such a message is highly possibly closed immediately without being fully viewed by the user. Moreover, when the user recognizes that a displayed popup message is a disturbance, the user's impression of an advertiser of the advertisement or to a provider of the application subjected to an evaluation and contained in a popup message may decrease.

An objective of the disclosure is to provide a service providing system, a service providing method, a terminal control method, and a non-transitory recording medium capable of displaying a message so as not to disturb a user while contents are being displayed.

A service providing system according to a first aspect of the present disclosure includes:
a terminal; and
a server communicably connected to the terminal,
in which:
the server includes a provider that provides, when identification information to identify contents is designated from the terminal, the contents associated with the identification information to the terminal;
the terminal includes a display that displays the contents obtained from the server on a screen;
the provider puts predetermined suppress information in the contents when a predetermined condition is satisfied; and
when a present date and time is within a display time period set to a popup message and the contents displayed on the screen do not contain the predetermined suppress information, the display displays, in the screen, the popup message so as to be laid over on the contents or displays the popup message instead of the contents, and when the displayed contents contain the predetermined suppress information, the display keeps displaying the contents in the screen.

In the service providing system according to the above aspect, when a busy level of the server satisfies a predetermined busy condition, the provider puts the predetermined suppress information in the contents.

In the service providing system according to the above aspect, the provider puts the predetermined suppress information in the contents associated with the identification information that has a designated number within a latest predetermined time period satisfying a predetermined high frequency condition.

A service providing method according to a second aspect of the present disclosure is executed by a service providing system comprising: a terminal; and a server communicably connected to the terminal, and the method causes:
the server to provide, when identification information to identify contents is designated from the terminal, the contents associated with the identification information to the terminal;
the terminal to display the contents obtained from the server on a screen;
the server puts predetermined suppress information in the contents when a predetermined condition is satisfied; and
when a present date and time is within a display time period set to a popup message and the contents displayed on the screen do not contain the predetermined suppress information, the terminal to display, in the screen, the popup message so as to be laid over on the contents or displays the popup message instead of the contents, and when the displayed contents contain the predetermined suppress information, the terminal to keep displaying the contents in the screen.

A terminal control method according to a third aspect of the present disclosure causes:
a terminal to display contents obtained from a server on a screen; and
when a present date and time is within a display time period set to a popup message and the contents displayed on the screen do not contain the predetermined suppress information, the terminal to display, in the screen, the popup message so as to be laid over on the contents or displays the popup message instead of the contents, and when the displayed contents contain the predetermined suppress information, the terminal to keep displaying the contents in the screen.

A program according to a fourth aspect of the present disclosure causes a computer to function as a display that displays contents obtained from a server,
in which, when a present date and time is within a display time period set to a popup message and the contents displayed on the screen do not contain the predetermined suppress information, the display displays, in the screen, the popup message so as to be laid over on the contents or displays the popup message instead of the contents, and when the displayed contents contain the predetermined suppress information, the display keeps displaying the contents in the screen.

Note that the above program may be distributed and sold via a computer communication network independently from a computer that executes the program. Moreover, an information recording medium that records the program is a non-transitory recording medium, and may be distributed and sold independently from the computer. The term non-transitory recording medium means a tangible information recording medium. An example non-transitory recording medium is a compact disc, a flexible disk, a hard disk, a magnetic disk, a digital video disk, a magnetic tape, or a semiconductor memory. Moreover, a transitory information recording medium means a transmission medium (carrier signals) itself. An example transitory recording medium is electric signals, optical signals, or electromagnetic waves. Not that a term temporal storing area is an area to temporary store data and a program, and is, for example, a volatile memory like a Random Access Memory (RAM).

According to the present disclosure, a message can be displayed so as not to disturb a user while contents are being displayed.

BRIEF DESCRIPTION OF THE DRAWINGS

A more complete understanding of this application can be obtained when the following detailed description is considered in conjunction with the following drawings, in which:

FIG. 4 is a diagram illustrating an example of data stored in a contents request past-record DB;

DETAILED DESCRIPTION

Figure 1:
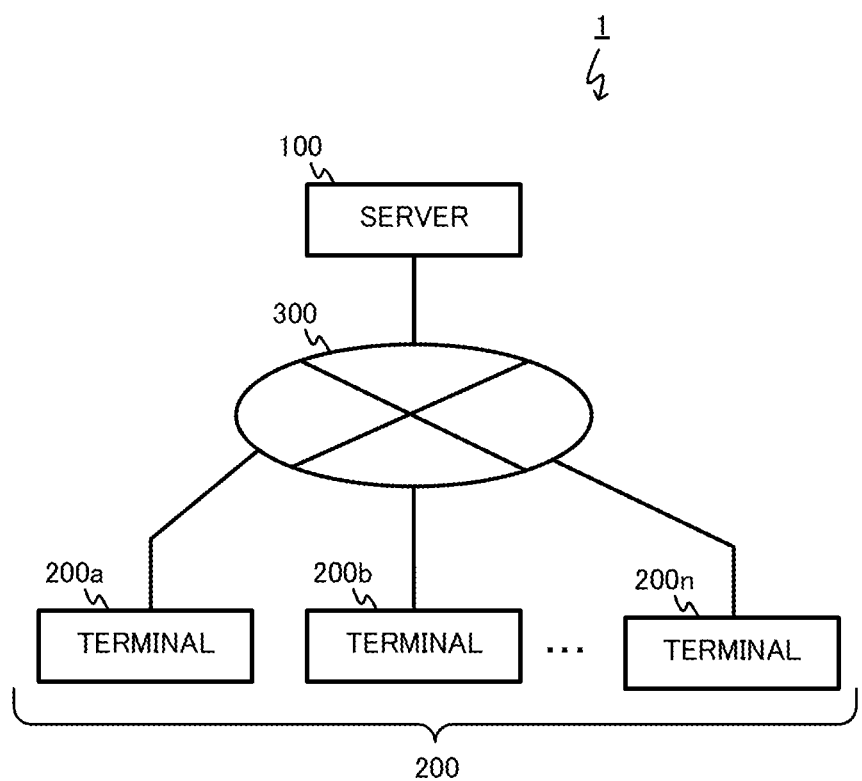
FIG. 1 is a diagram illustrating a structure of a service providing system according to an embodiment of the present disclosure.

Embodiments of the present disclosure will be described below. Note that the embodiments are for description purpose only, and are not intended to limit the scope of the present disclosure. Hence, a person skilled in the art could adopt an embodiment in which each or all elements are replaced with equivalents, and such embodiment is also within the scope of the present disclosure. Moreover, in the description on the embodiment of the present disclosure with reference to the accompanying drawings, the same reference numeral will be given to the same or similar element.

FIG. 1 illustrates a structure of a service providing system 1 according to Embodiment 1 of the present disclosure. The service providing system 1 provides a service (a contents service) that provides contents to a user via the Internet 300. In the present embodiment, example contents to be provided by the service providing system 1 are information that changes in a real-time manner, such as information on a horse racing, information on a currency trading, and information on a winner announcement of a lottery.

As illustrated in FIG. 1, the service providing system 1 includes a server 100 and terminals 200a, 200b, and 200n (those are collectively referred to as the "terminal 200" below). The respective devices are connected to each other so as to be communicable via the Internet 300.

The server 100 manages the contents service. In the present embodiment, the server 100 receives, from the terminal 200, a designation of the contents that can be provided in the contents service, and transmits the designated contents to the terminal 200. Moreover, the server 100 puts, in the contents, suppress information for a control on displaying or un-displaying a popup message to be described later, and transmits such contents to the terminal 200.

The terminal 200 is a computer operated by the user who utilizes the contents service. In the present embodiment, an application (a contents viewing application) for viewing the contents provided by the contents service is installed in the terminal 200. Next, while executing the application, when receiving a selection of the contents that the user wants to view, the terminal 200 transmits identification information of the contents to the server 100. Next, the terminal 200 displays the contents received from the server 100. Furthermore, the terminal 200 executes a control on displaying or un-displaying the popup message to be described later in accordance with the suppress information contained in the contents.

Next, a structure of the server 100 or the terminal 200 will be described in detail.

Figure 2:
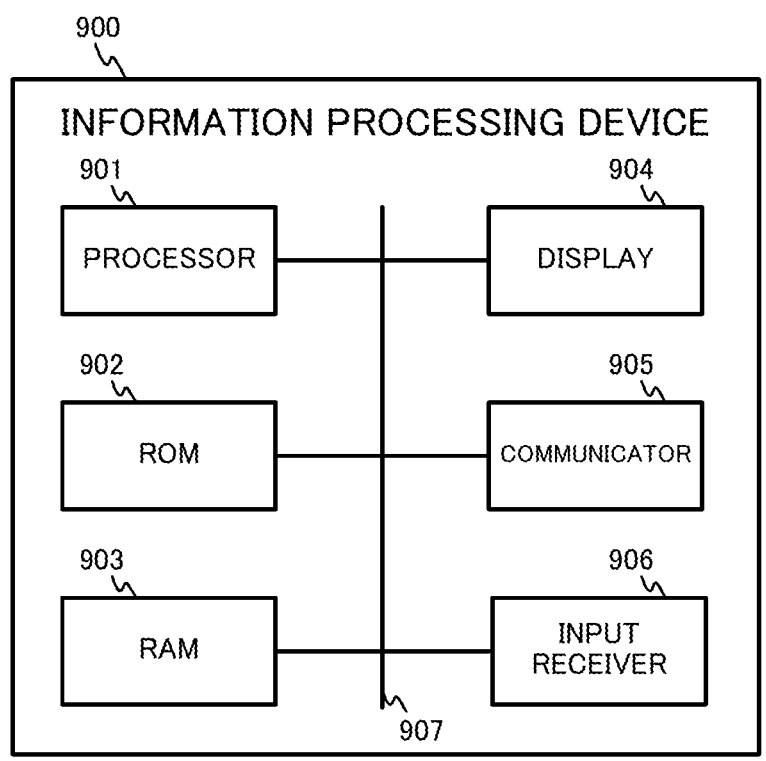
FIG. 2 is a schematic block diagram illustrating a hardware structure of an information processing device that accomplishes a server or a terminal according to the embodiment.

FIG. 2 is a schematic block diagram illustrating a hardware structure of an information processing device 900 that accomplishes the server 100 or the terminal 200. As illustrated in FIG. 2, the information processing device 900 includes a processor 901, a Read-Only Memory (ROM) 902, a Random Access Memory (RAM) 903, a display 904, a communicator 905, and an input receiver 906. These components are connected each other through a bus 907.

The processor 901 includes, for example, a Central Processing Unit (CPU), and controls the information processing device 900 entirely.

The ROM 902 is a non-volatile memory that stores programs and various data for causing the processor 901 to control the information processing device 900 entirely.

The RAM 903 is a volatile memory that temporarily stores information created by the processor 901 and necessary data to create such formation.

The display 904 includes a display device that includes a Liquid Crystal Display (LCD), a back light, and the like. The display 904 displays, for example, data output by the processor 901 under the control by the processor 901.

The communicator 905 includes a communication interface for connecting the information processing device 900 to the Internet 300.

The input receiver 906 includes input devices, such as buttons, a keyboard, and a touch panel. The input receiver 906 receives an operational input by a user of the information processing device 900, and outputs signals corresponding to the received operational input to the processor 901.

The server 100 or the terminal 200 according to the present embodiment is accomplished by activating the information processing device 900 and executing thereon a program causing the activated information processing device to function as the server 100 or the terminal 200 according to the present embodiment.

Next, a functional structure of the server 100 and that of the terminal 200 will be described.

Figure 3:
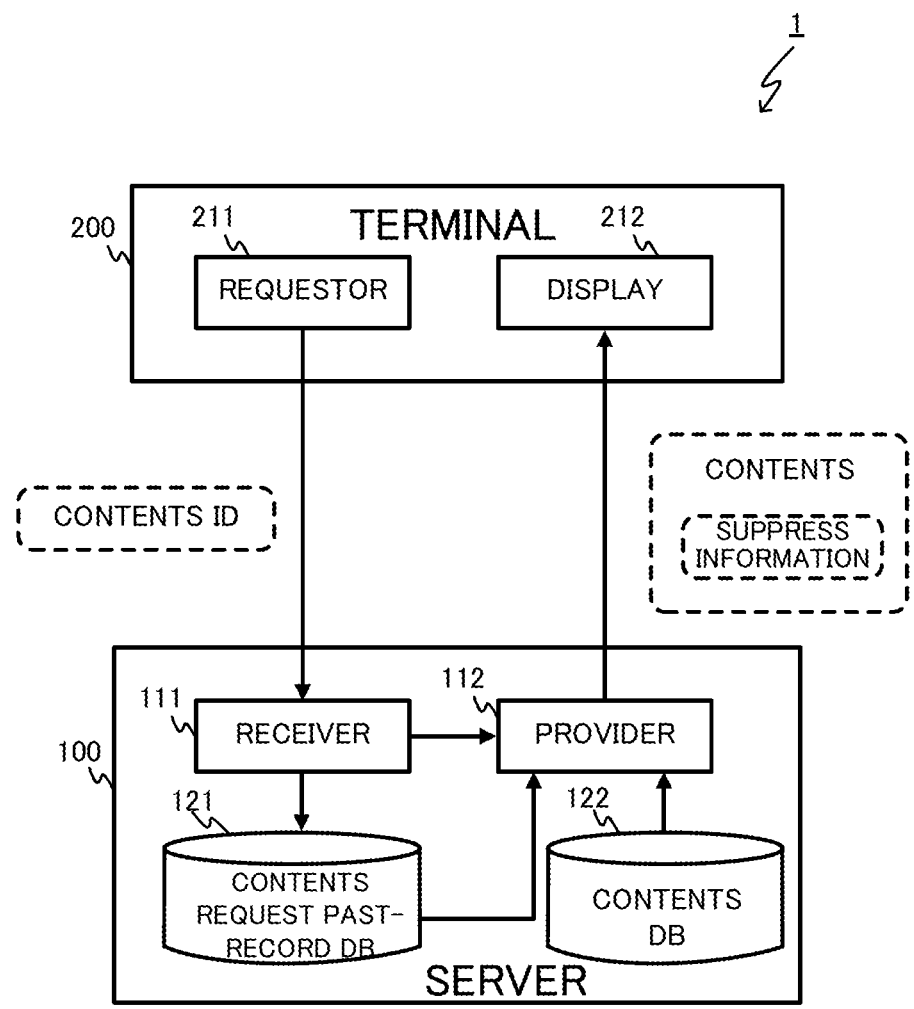
FIG. 3 is a schematic block diagram illustrating a functional structure of the server and that of the terminal according to the embodiment.

FIG. 3 is a schematic block diagram illustrating the functional structure of the server 100 and that of the terminal 200. First, the functional structure of the server 100 will be described. As illustrated in FIG. 3, the server 100 functions as a receiver 111, a provider 112, a contents request past-record Data Base (DB) 121, and a contents DB 122. More specifically, the receiver 111 and the provider 112 are accomplished by the processor 901 and communicator 905 of the information processing device 900 that work together. Moreover, the contents request past-record DB 121 and the contents DB 122 are accomplished by the ROM 902 of the information processing device 900. Note that the contents request past-record DB 121 and the contents DB 122 may be realized by an external storage device of the information processing device 900 instead of the ROM 902.

The receiver 111 receives, from the terminal 200, a designation of the contents to be provided to the terminal 200. More specifically, the receiver 111 receives a contents request that contains the identification information to identify the contents (the contents ID) from the terminal 200. The contents ID is allocated to each contents by an operator of the contents service in advance, and is indicated as, for example, an identification number or a Uniform Resource Locator (URL). Next, the receiver 111 stores the contents ID contained in the received contents request in the contents request past-record DB 121 in association with the date and time at which the contents request is received.

FIG. 4 illustrates an example of data stored in the contents request past-record DB 121. As illustrated in FIG. 4, the contents request past-record DB 121 stores, in association with each other, a receiving date and time at which the contents request is received, and the contents ID contained in the received contents request. Among the pieces of data stored in the contents request past-record DB 121, data that has a predetermined time period elapsed may be deleted.

The provider 112 provides, to the terminal 200, the contents associated with the contents ID received by the receiver 111. More specifically, when the receiver 111 receives the contents request from the terminal 200, the provider 112 obtains the contents associated with the contents ID contained in the received contents request from the contents DB 122, and transmits the obtained contents to the terminal 200 that has transmitted the contents request.

Moreover, the provider 112 puts, in the contents to be transmitted to the terminal 200, predetermined suppress information when a predetermined condition is satisfied. In this case, the predetermined suppress information is information for suppressing the popup message to be displayed on the screen of the terminal 200, and is, for example, a tag that indicates a suppression of the display. Moreover, the predetermined condition is a circumstance in which, for example, a busy level of the server 100 satisfies a predetermined busy condition. The busy level indicates, for example, the number of the contents requests received from the terminals 200 per a unit of time, that is, the frequency of the contents requests. For example, the provider 112 refers to the contents request past-record DB 121, calculates, as the busy level, the number of the contents requests (the number of contents IDs) received within the latest unit of time (for example, 5 minutes), and determines that the busy level satisfies the predetermined busy condition when the calculated busy level is higher than a predetermined threshold. Moreover, the busy level may indicate the increase rate of the frequency of contents requests. In this case, the provider 112 may refer to the contents request past-record DB 121, calculate, as the busy level, the latest increase rate of the frequency of the contents requests, and determine that the busy level satisfies the predetermined busy condition when the calculated busy level is higher than the predetermined threshold. Moreover, as the busy level, in addition to the number of contents request per a unit of time, the number of views for the contents, and the number of users who are accessing the server 100 may be applied. Moreover, a numerical value applied for the calculation of the busy level may be recorded as a past-record, and a predetermined threshold may be obtained from an average value or a median value based on statistics on the past-records. Furthermore, the busy level of the server 100 may be indicated in multiple stages, such as "not busy", "moderate", and "busy". In that case, a threshold between the respective stages may be obtained based on statistics on the past-records of the busy level.

When the busy level of the server 100 is higher than the predetermined threshold as described above, the server 100 is highly possibly providing the contents that are getting attention from a large number of users. When, for example, the contents are a live motion image for a horse racing or a publicity page of the result of the horse racing, the user who wants to view the progress of the horse racing and the result thereof may transmit, to the server via the terminal 200, the contents request to such contents in a time slot from the beginning of the horse racing and until the result is settled, or in a time slot before or after the announcement of the horse racing result. Moreover, when, for example, the contents are a live motion image of an announcement of winning numbers of a lottery, the user who wants to view the announcement of the winning numbers may transmit, to the server via the terminal 200, the contents request to such contents in a time slot before and after the announcement of winning numbers. Hence, the number of the contents requests to the server 100 in such a time slot increases, and the busy level of the server 100 is expected to become higher than usual. In the present embodiment, based on an assumption such that when the busy level of the server 100 is higher than the predetermined threshold and when the contents request is received, the user of the terminal 200 that has transmitted such a contents request is requesting the contents that are also getting attention from other users, the possibility of getting attention to such contents is high, and thus the suppress information is put in the contents relating to the contents request. This suppresses a popup message to be displayed while the contents that are expected as getting attention from the users are being displayed.

Next, the functional structure of the terminal 200 will be described. As illustrated in FIG. 3, the terminal 200 functions as a requestor 211 and a display 212. More specifically, the requestor 211 and the display 212 are accomplished by the processor 901, display 904, and communicator 905 of the information processing device 900 that work together.

The requestor 211 requires the server 100 to transmit the contents. More specifically, the requestor 211 receives, for example, a designation of the contents that the user wants to view via the input receiver 906. Next, the requestor 211 transmits, to the server 100, the contents request that contains the contents ID associated with the designated contents.

The display 212 displays, on the screen of the display 904, the contents obtained from the server 100. Moreover, when the present date and time is within a display time period set to the popup message and when the contents being displayed on the screen do not contain the predetermined suppress information, the display 212 displays, within the screen, the popup message on the screen so as to be laid over on the screen. Moreover, when the present date and time is within the display time period set to the popup message and when the contents being displayed on the screen contains the predetermined suppress information, the display 212 keeps displaying the contents on the screen.

In this case, the popup message is to be displayed regardless of an instruction from the user while the contents are being displayed. The details on the popup message can be set as appropriate by the operator of the contents service, and are, for example, a message that prompts the user to input with respect to a questionnaire or an evaluation to the contents viewing application, or a message indicating a notification of the information relevant to the contents. Moreover, the display time period for displaying the popup message on the screen is set in advance to the popup message. The display time period is set together with a display start timing, such as a predetermined time after the activation of the contents viewing application, or an intermittent predetermined time after the activation of the contents application. The display time period is, for example, set on a program of the contents viewing application in advance.

More specifically, the display 212 determines whether or not the present date and time is within the display time period set to the popup message. Next, when the present date and time is within the display time period and when the contents do not contain the suppress information, the display 212 displays the popup message so as to be laid over on the contents.

Figure 5A:
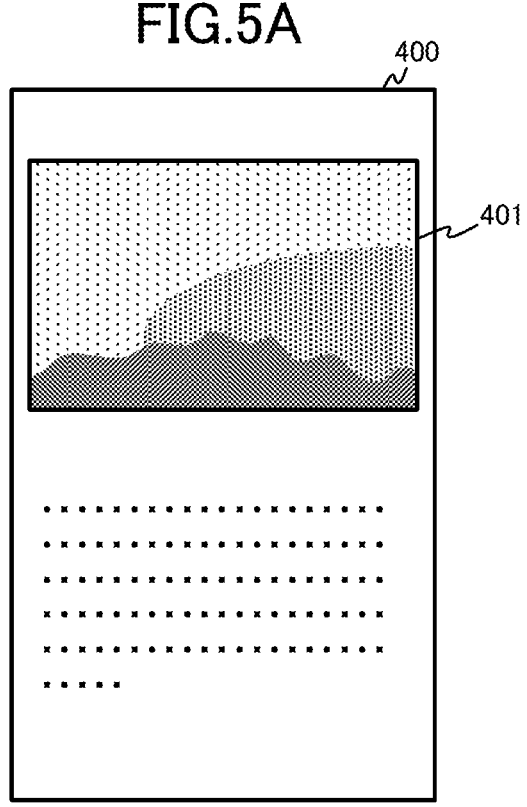
FIGS. 5A and 5B are each a diagram illustrating a display example of a screen of the terminal according to the embodiment.
Figure 5B:
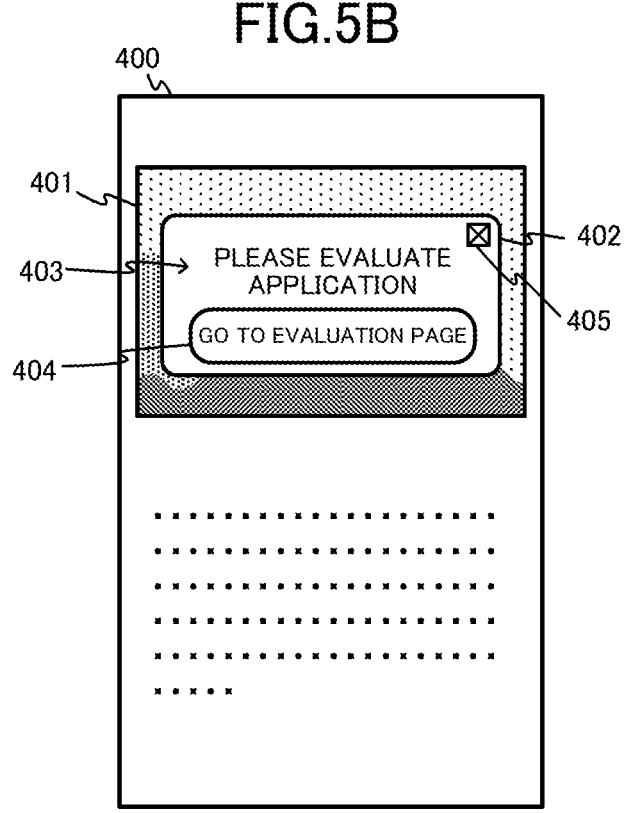

A display example of the contents displayed on the screen of the terminal 200 and the popup message displayed so as to be laid over on contents will be described with reference to FIGS. 5A and 5B. FIG. 5A illustrates a display example of a screen 400 of the terminal 200 in a state in which no popup message is displayed while the contents viewing application is being executed. As illustrated in FIG. 5A, the screen 400 has image contents 401 that change in a real-time manner like a live image of a horse racing in session. FIG. 5B illustrates a display example of the screen 400 of the terminal 200 in a state in which the popup message is displayed while the contents viewing application is being executed. In the state illustrated in FIG. 5A, when the present date and time is within the display time period set to a popup message 403 and when the image contents 401 do not contain the suppress information, the display 212 displays a popup object 402 so as to be laid over on the image contents 401 as illustrated in FIG. 5B. The popup object 402 includes the popup message 403, an evaluation page button 404, and a close button 405. The popup message 403 is to prompt the user to input an evaluation for the contents viewing application. The evaluation page button 404 is linked to a WEB page (an evaluation page) to input an evaluation for the contents viewing application. The close button 405 is to close the displayed popup object 402. As illustrated in FIG. 5B, when the popup object 402 is displayed on the image contents 401 and when the user selects the evaluation page button 404, the screen 400 transitions to the evaluation page. Moreover, when the user selects the close button 405, the displayed popup object 402 is closed, and the screen 400 returns to the state illustrated in FIG. 5A.

Figure 6:
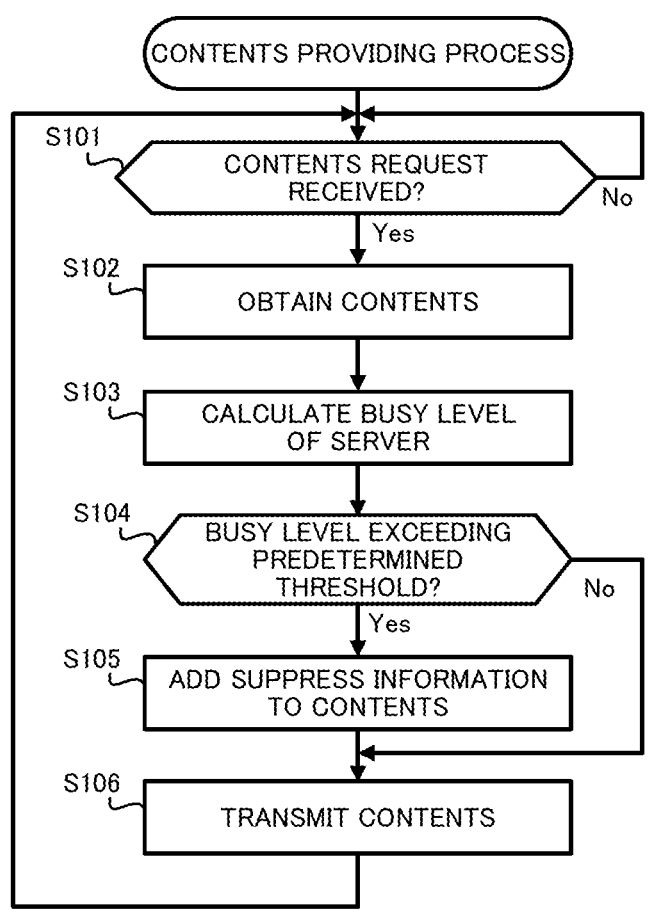
FIG. 6 is a process flowchart illustrating a process flow of a contents providing process executed by the server according to the embodiment.

Next, an operation of the server 100 according to the embodiment of the present disclosure will be described. FIG. 6 is a process flowchart illustrating a process flow of a contents providing process executed by the server 100. This process starts when, for example, an instruction which is to start this process and which is input by the user via the input receiver 906 is received.

When this process starts, the receiver 111 determines whether or not the contents request is received from the terminal 200 (step S101). The receiver 111 stands by until receiving a query (step S101: NO).

When the receiver 111 receives the contents request from the terminal 200 (step S101: YES), the provider 112 refers to the contents DB 122, and obtains the contents associated with the contents ID contained in the contents request received in the step S101 (step S102).

Next, the provider 112 refers to the contents request past-record DB 121, and calculates the busy level of the server 100 (step S103).

Next, the provider 112 determines whether or not the busy level calculated in the step S103 is exceeding the predetermined threshold (step S104). When determining that the busy level does not exceed the predetermined threshold (step S104: NO), the provider 112 progresses the process to step S106.

When determining that the busy level is exceeding the predetermined threshold (step S104: YES), the provider 112 adds the suppress information to the contents obtained in the step S102 (step S105).

Next, the provider 112 transmits the contents to the terminal 200 that has transmitted the contents request received in the step S101 (step S106). Next, the server 100 returns the process to the step S101, and repeatedly executes the above process until, for example, receiving an instruction which is to terminate this process and which is input by the user via the input receiver 906.

Figure 7:
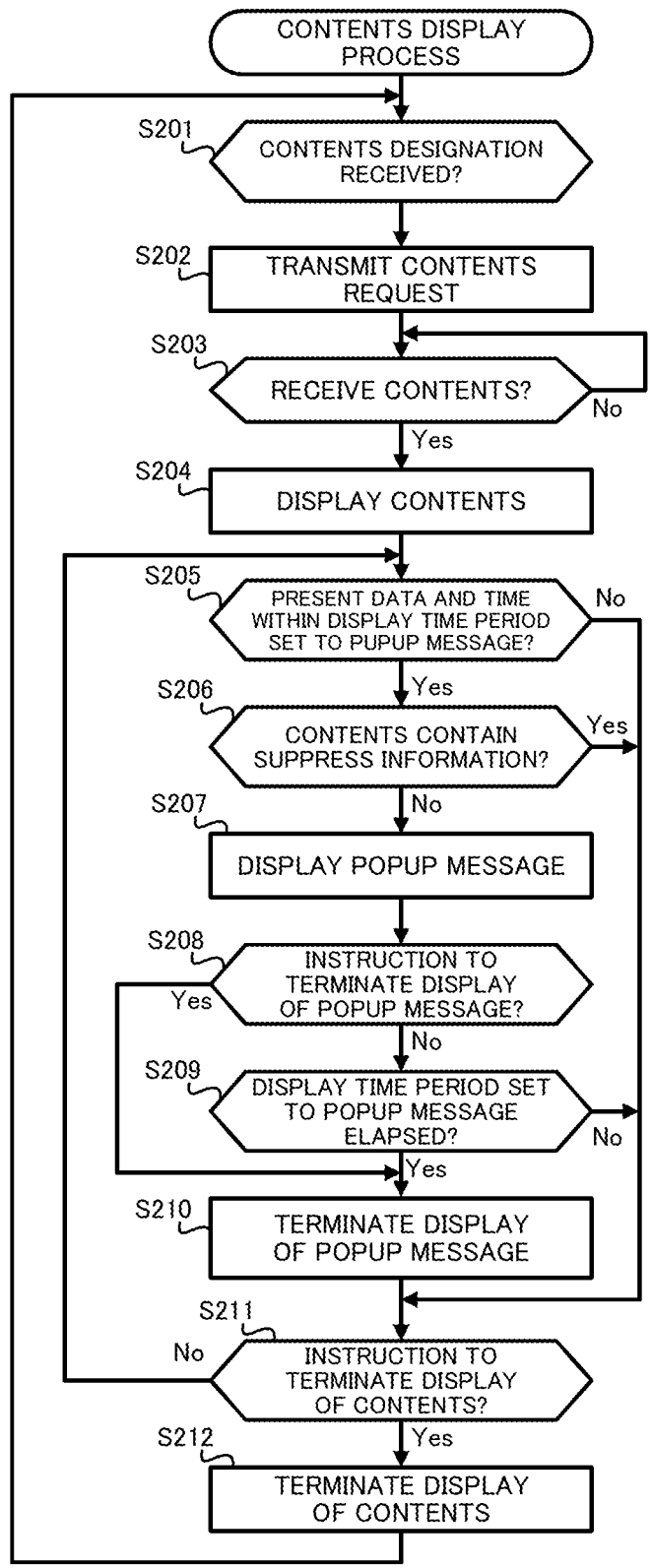
FIG. 7 is a process flowchart illustrating a process flow of a contents displaying process executed by the terminal according to the embodiment.

Next, an operation of the terminal 200 according to the embodiment of the present disclosure will be described. FIG. 7 is a process flowchart illustrating a process flow of a contents displaying process executed by the terminal 200. This processing starts when, for example, an instruction which is to start this process and which is input by the user via the input receiver 906 is received.

When this process starts, the requestor 211 determines whether or not a designation of the contents is received from the user via the input receiver 906 (step S201). The requestor 211 stands by until receiving the designation of the contents (step S201: NO).

When receiving the designation of the contents (step S201: YES), the requestor 211 transmits, to the server 100, the contents request that contains the contents ID associated with the designated contents (step S202).

Next, the display 212 determines whether or not the contents are received from the server 100 (step S203). The display 212 stands by until receiving the contents (step S203: NO).

When receiving the contents (step S203: YES), the display 212 displays the contents on the screen of the display 904 (Step S204).

Next, the display 212 determines whether or not the present date and time is within the display time period set to the popup message (step S205). When the present date and time is not within the display time period (step S205: NO), the display 212 progresses the process to step S211.

When the present date and time is within the display time period (step S205: YES), the display 212 determines whether or not the suppress information is contained in the contents that is being displayed (step S206). When the suppress information is contained in the contents that is being displayed (step S206: YES), the display 212 progresses the process to step S211.

When the suppress information is not contained in the contents that is being displayed (step S206: NO), the display 212 displays the popup message so as to be laid over on the contents that is being displayed in the screen (step S207).

Next, the display 212 determines whether or not an instruction to terminate the display of the popup message is received from the user (step S208). When receiving the instruction to terminate the display of the popup message (step S208: YES), the display 212 terminates the display of the popup message (step S210).

When not receiving the instruction to terminate the display of the popup message (step S208: NO), the display 212 determines whether or not the display time period set to the popup message has elapsed (Step S209). When the display time period set to the popup message has not elapsed yet (step S209: NO), the display 212 progresses the process to step S211.

When the display time period set to the popup message has elapsed (step S209: YES), the display 212 terminates the display of the popup message (step S210).

Next, the display 212 determines whether or not, for example, an instruction to terminate the display of the contents is received from the user (step S211). When the instruction to terminate the display of the contents is not received (step S211: NO), the display 212 returns the process to the step S205.

When receiving the instruction to terminate the display of the contents (step S211: YES), the display 212 terminates the display of the contents (step S212). Next, the terminal 200 returns the process to the step S201, and repeatedly executes the above process until receiving the instruction which is to terminate this process and which is input by the user via the input receiver 906.

As described above, the server 100 according to the embodiment of the present disclosure provides, when receiving the contents request from the terminal 200, the contents that contains the suppress information to the terminal 200 when the busy level of the server 100 satisfies the predetermined busy condition. Moreover, when the suppress information is contained in the contents provided from the server 100, the terminal 200 keeps displaying the contents without displaying the popup message even if the present date and time is within the display time period set to the popup message. Furthermore, when the suppress information is not contained in the contents, the terminal 200 displays the popup message when the present date and time is within the display time period set to the popup message. Accordingly, while the contents are being displayed, the popup message can be displayed so as not to disturb the user.

Moreover, the server 100 according to the embodiment of the present disclosure puts the suppress information in the contents when the busy level of the server 100 exceeds the predetermined threshold. When the busy level of the server 100 is exceeding the predetermined threshold, a possibility such that the contents provided by the server 100 are getting attention from a large number of users is high, and a possibility such that the user of the terminal 200 that has transmitted the contents request also pays attention to the provided contents is high. Hence, the server 100 can suppress the display of the popup message so as not to disturb the user while the contents that are highly possibly getting attention from the user are being displayed by putting the suppress information in the contents.

Although the embodiment of the present disclosure has been described above, the above-described embodiment is merely an example and the applicable field of the present disclosure is not limited to this example. That is, various modifications can be made to the embodiment of the present disclosure, and various kinds of embodiments fall in the scope of the present disclosure.

For example, in the above-described embodiment, the example has been described in which the server 100 puts the suppress information in the contents when the busy level of the server 100 satisfies the predetermined busy condition. However, the condition such that the server 100 puts the suppress information in the contents is not limited to this example. For example, the provider 112 of the server 100 may put the suppress information in the contents associated with the contents ID that has the number of designations which is within the latest predetermined time period and which satisfies a predetermined high frequency condition. More specifically when, for example, receiving the contents request that includes a contents ID "C001" from the terminal 200, the provider 112 of the server 100 refers to the contents request past-record DB 121, and determines whether or not the received number of contents requests that contains the contents ID "C001" exceeds a predetermined threshold within the latest predetermined time period. Next, when determining that the received number of contents requests exceeds the predetermined threshold, the provider 112 determines that the predetermined high frequency condition is satisfied, puts the suppress information in the contents associated with the contents ID "C001", and provides such contents to the terminal 200. In this case, the predetermined threshold may be an average value or a median value of the received number of contents requests that contain the contents ID. Hence, the suppress information can be put in the contents that have a high frequency of contents request presently, that is, the contents with a high user's audience rating, thereby suppressing the display of the popup message regarding the contents that have a high user's audience rating.

Figure 8:
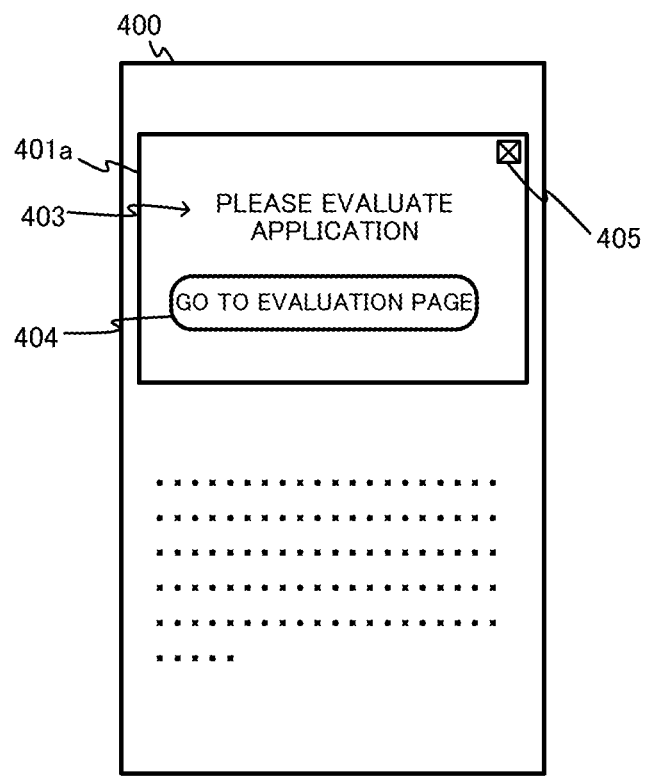
FIG. 8 is a diagram illustrating a display example of the screen of the terminal according to a modified example.

Moreover, in the above-described embodiment, the example has been described in which the display 212 of the terminal 200 displays the popup message so as to be laid over on the contents in the screen as illustrated in FIG. 5B. However, the display scheme of the popup message in the screen is not limited to this example. For example, as illustrated in FIG. 8, the display 212 of the terminal 200 may display the popup message on the screen instead of the contents. According to the example illustrated in FIG. 8, the popup message 403, the evaluation page button 404, and the close button 405 are displayed instead of the image contents 401 within a contents display area 401a where the image contents 401 is displayed with the popup message not displayed as illustrated in FIG. 5A. From the state illustrated in FIG. 8, when the user selects the evaluation page button 404, the screen 400 transitions to the evaluation page. Moreover, when the user selects the close button 405, the displayed popup message 403, evaluation page button 404, and close button 405 are closed, and the screen 400 returns to the state illustrated in FIG. 5A.

Although the server 100 and terminal 200 according to the present disclosure with the structure to accomplish the above-described functions being equipped in advance can be provided, already-existing personal computers or information terminal devices, and the like, may function as the server 100 or the terminal 200 of the present disclosure by applying a program. That is, a program to accomplish the above-described functional structure by the server 100 exemplified in the above embodiment may be applied to an already-existing personal computer or information terminal device so as to enable the CPU, and the like of the already-existing personal computer or information terminal device to execute the program. This enables the personal computer or the information terminal device to function as the server 100 or the terminal 200 according to the present disclosure. Moreover, a service providing method according to the present disclosure can be executed using the server 100. Furthermore, a terminal control method according to the present disclosure can be executed using the terminal 200.

Moreover, such a program is applicable by various schemes in addition to the above-described scheme. For example, the program that is stored in a non-transitory computer-readable recording medium, such as a Compact Disc Read-Only Memory (CD-ROM), a Digital Versatile Disc (DVD), or a Magneto Optical disc (MO), may be applied, or the program that is stored in a storage device over the network like the Internet may be downloaded and applied.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

What is claimed is:

1. A service providing system comprising:
a terminal; and
a server communicably connected to the terminal,
wherein the server comprises:
at least one memory configured to store computer program code; and
at least one processor configured to access said computer program code and operate as instructed by said computer program code, said computer program code including:
provider code configured to cause at least one of said at least one processor to:
provide, when identification information is designated from the terminal, contents, wherein the contents is associated with the identification information, and
put predetermined suppress information in the contents, wherein the suppress information corresponds to a live real-time event,
wherein the terminal comprises a screen configured to display at least a portion of the contents, and
wherein when a present date and time corresponds to the live real-time event and the present date and time is within a display time period of a popup message, the terminal is configured to, on a basis of the predetermined suppress information, suppress a display by the terminal on the screen of the popup message.

2. A service providing method executed by a server in a service providing system, said service providing method comprising:
providing, by the server when identification information is designated from a terminal, contents, wherein the contents is associated with the identification information;
causing the terminal to display the contents on a screen of the terminal; and
putting, by the server, predetermined suppress information in the contents,
wherein the suppress information corresponds to a live real-time event, and
the predetermined suppress information is configured to cause, when a present date and time corresponds to the live real-time event and the present date and time is within a display time period of a popup message, a suppression of display of the popup message by the terminal.

3. A terminal control method comprising:
sending, by a terminal to a server, designation information;
receiving contents at the terminal from a server, wherein the contents is associated with the designation information, the contents includes predetermined suppress information, the predetermined suppress information corresponds to a live real-time event, and the predetermined suppress information is configured to cause a suppression of display of a popup message by the terminal;
displaying, by the terminal on a screen, the contents; and
when a present date and time corresponding to the live real-time event is within a display time period of a popup message, suppressing, on a basis of the predetermined suppress information, a display of the popup message.

4. A non-transitory recording medium storing a program that causes a terminal to:
send, by the terminal to a server, designation information;
receive contents at the terminal from a server, wherein the contents is associated with the designation information, the contents includes predetermined suppress information, the predetermined suppress information corresponds to a live real-time event, and the predetermined suppress information is configured to cause a suppression of display of a popup message by the terminal;
display, by the terminal on a screen, the contents; and
when a present date and time corresponding to the live real-time event is within a display time period of a popup message, suppress, on a basis of the predetermined suppress information, a display of the popup message.

5. The service providing system of claim 1, wherein the live real-time event is a finish of a horse race.

6. The service providing system of claim 1, wherein the live real-time event is an announcement.

7. The service providing system of claim 1, wherein the live real-time event is a currency trading event.

8. The service providing system of claim 1, wherein the live real-time event is a lottery drawing or a lottery announcement.

9. The service providing method of claim 2, wherein the live real-time event is a finish of a horse race.

10. The service providing method of claim 2, wherein the live real-time event is an announcement.

11. The service providing method of claim 2, wherein the live real-time event is a currency trading event.

12. The service providing method of claim 2, wherein the live real-time event is a lottery drawing or a lottery announcement.

13. A service providing system comprising:
a terminal; and
a server communicably connected to the terminal,
wherein the server comprises:
at least one memory configured to store computer program code; and at least one processor configured to access said computer program code and operate as instructed by said computer program code, said computer program code including:

provider code configured to cause at least one of said at least one processor to:
provide, when identification information is designated from the terminal, contents, wherein the contents is associated with the identification information, and
put predetermined suppress information in the contents when a predetermined condition is satisfied, wherein the predetermined condition corresponds to:
A) a busy level of the server satisfying a predetermined busy condition, or
B) the identification information having a designated number of requests within a latest predetermined time period satisfying a predetermined high frequency condition;

the terminal comprises a display configured to display at least a portion of the contents obtained from the server on a screen; and when a present date and time is within a display time period set to a popup message and second contents displayed on the screen do not contain the predetermined suppress information, the display displays, in the screen, the popup message so as to be laid over on the second contents or displays the popup message instead of the second contents, and when the displayed contents contain the predetermined suppress information, the display keeps displaying the contents in the screen.

* * * * *